US010464617B2

(12) United States Patent
Findley et al.

(10) Patent No.: US 10,464,617 B2
(45) Date of Patent: Nov. 5, 2019

(54) MODULAR SIDEWALL FOR PASSENGER VEHICLE

(71) Applicant: Champion Bus, Inc., Imlay City, MI (US)

(72) Inventors: Steve Findley, Summerville, SC (US); Allan Schmitz, Mussey Twp., MI (US)

(73) Assignee: Champion Bus, Inc., Imlay City, MI (US)

( * ) Notice: Subject to any disclaimer, the term of this patent is extended or adjusted under 35 U.S.C. 154(b) by 135 days.

(21) Appl. No.: 15/824,619

(22) Filed: Nov. 28, 2017

(65) Prior Publication Data

US 2019/0161130 A1     May 30, 2019

(51) Int. Cl.
*B62D 23/00* (2006.01)
*B62D 31/02* (2006.01)

(52) U.S. Cl.
CPC ......... *B62D 31/025* (2013.01); *B62D 23/005* (2013.01)

(58) Field of Classification Search
CPC ............................ B62D 31/025; B62D 23/005
USPC ..................................................... 296/193.05
See application file for complete search history.

(56) References Cited

U.S. PATENT DOCUMENTS

| | | | | |
|---|---|---|---|---|
| 3,881,765 A * | 5/1975 | Cerra | ..................... | B62D 31/02 105/401 |
| 4,283,086 A * | 8/1981 | Morin | ..................... | B62D 27/04 296/178 |
| 5,066,067 A * | 11/1991 | Ferdows | ................... | B60P 3/32 296/193.04 |
| 5,797,646 A * | 8/1998 | Jeunehomme | ....... | B61D 17/045 105/396 |
| 5,934,739 A * | 8/1999 | Waldeck | .............. | B61D 17/041 296/178 |
| 6,224,144 B1 * | 5/2001 | Veit-Salomon | ...... | B61D 17/045 296/203.03 |
| 6,308,411 B1 * | 10/2001 | Wright, Jr. | ............. | B21D 11/20 29/448 |
| 7,097,232 B2 * | 8/2006 | Beaudry | ................ | B62D 21/18 180/311 |
| 7,549,696 B1 * | 6/2009 | Timmermans | ......... | B62D 31/02 296/178 |
| 7,648,190 B2 * | 1/2010 | Timmermans | ......... | B62D 25/06 296/178 |
| 7,862,101 B2 * | 1/2011 | Lusk | ................... | B60R 16/0207 296/178 |
| 9,884,663 B2 * | 2/2018 | Czinger | ............... | B62D 23/005 |

(Continued)

FOREIGN PATENT DOCUMENTS

WO   WO-2015013791 A1 *   2/2015   ............. B62D 21/02
WO   WO-2017084922 A1 *   5/2017   ........... B62D 31/025

*Primary Examiner* — Pinel E Romain
(74) *Attorney, Agent, or Firm* — Michael Best & Friedrich LLP

(57) ABSTRACT

A modular sidewall for a passenger vehicle. The modular sidewall comprises an outer frame, and a plurality of individual sections configured to be secured together at least partially within the outer frame. The plurality of individual sections includes a main section presenting at least one window opening configured to receive a window, and a standard section presenting at least one window opening configured to receive a window. The said standard section has a width that is smaller than a width of said main section. The modular sidewall may also include a seat rail for supporting one or more seats within the passenger vehicle.

20 Claims, 10 Drawing Sheets

(56) References Cited

U.S. PATENT DOCUMENTS

2017/0240215 A1* 8/2017 LaRose ................ B62D 31/025
2017/0259854 A1* 9/2017 Sausaman .............. B62D 31/02

* cited by examiner

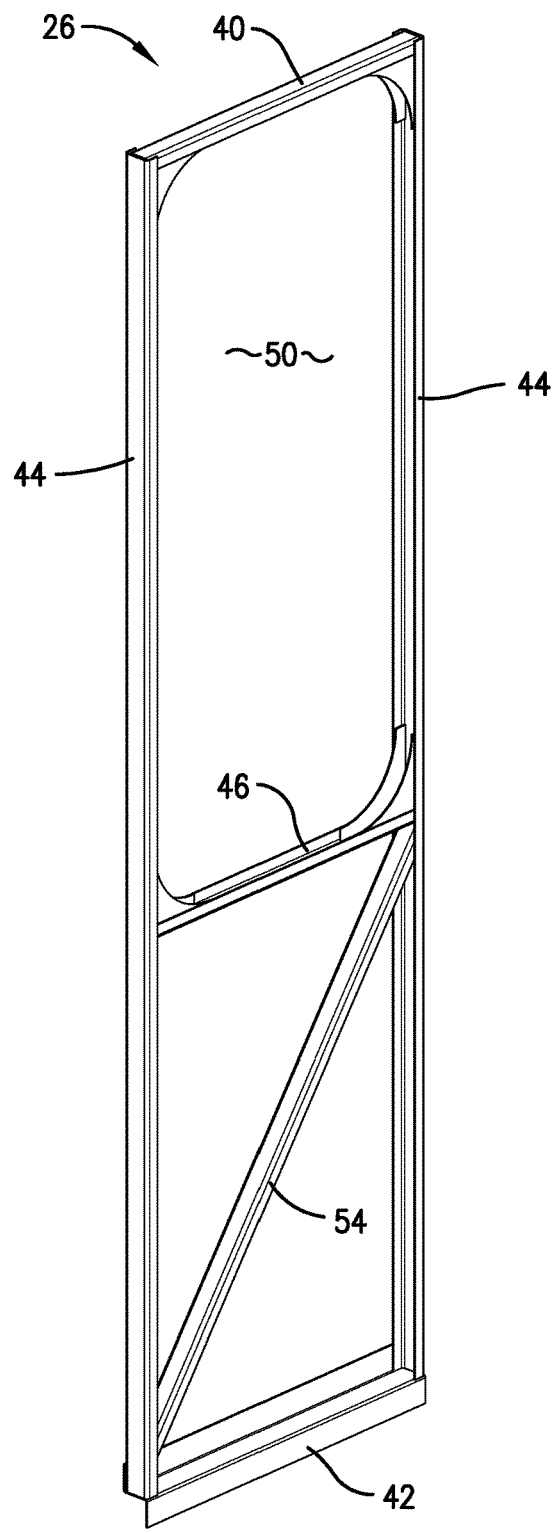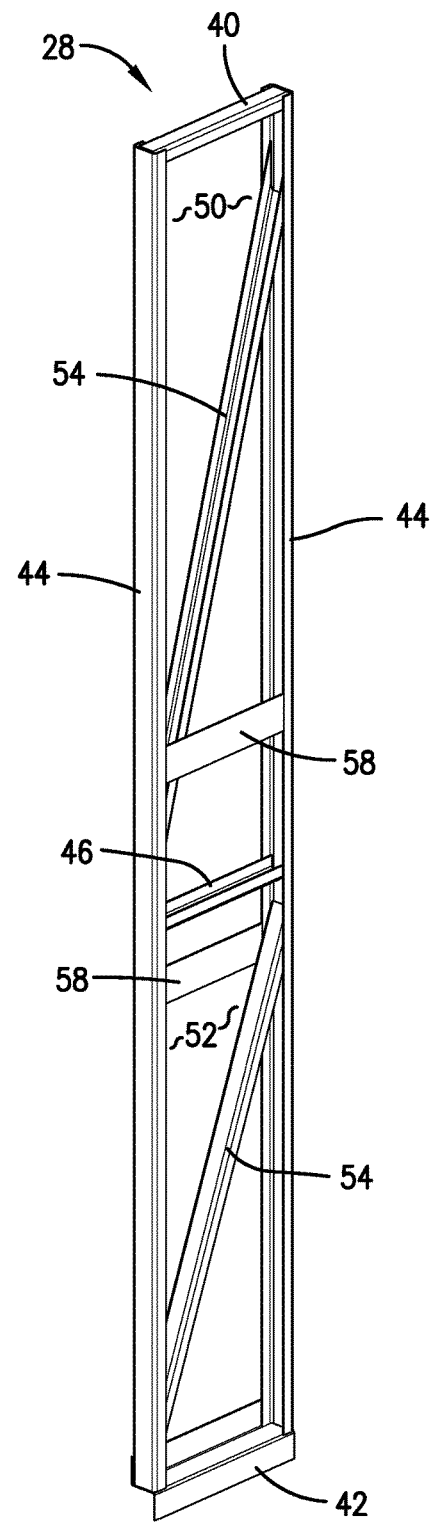
Fig. 6.
Fig. 7.

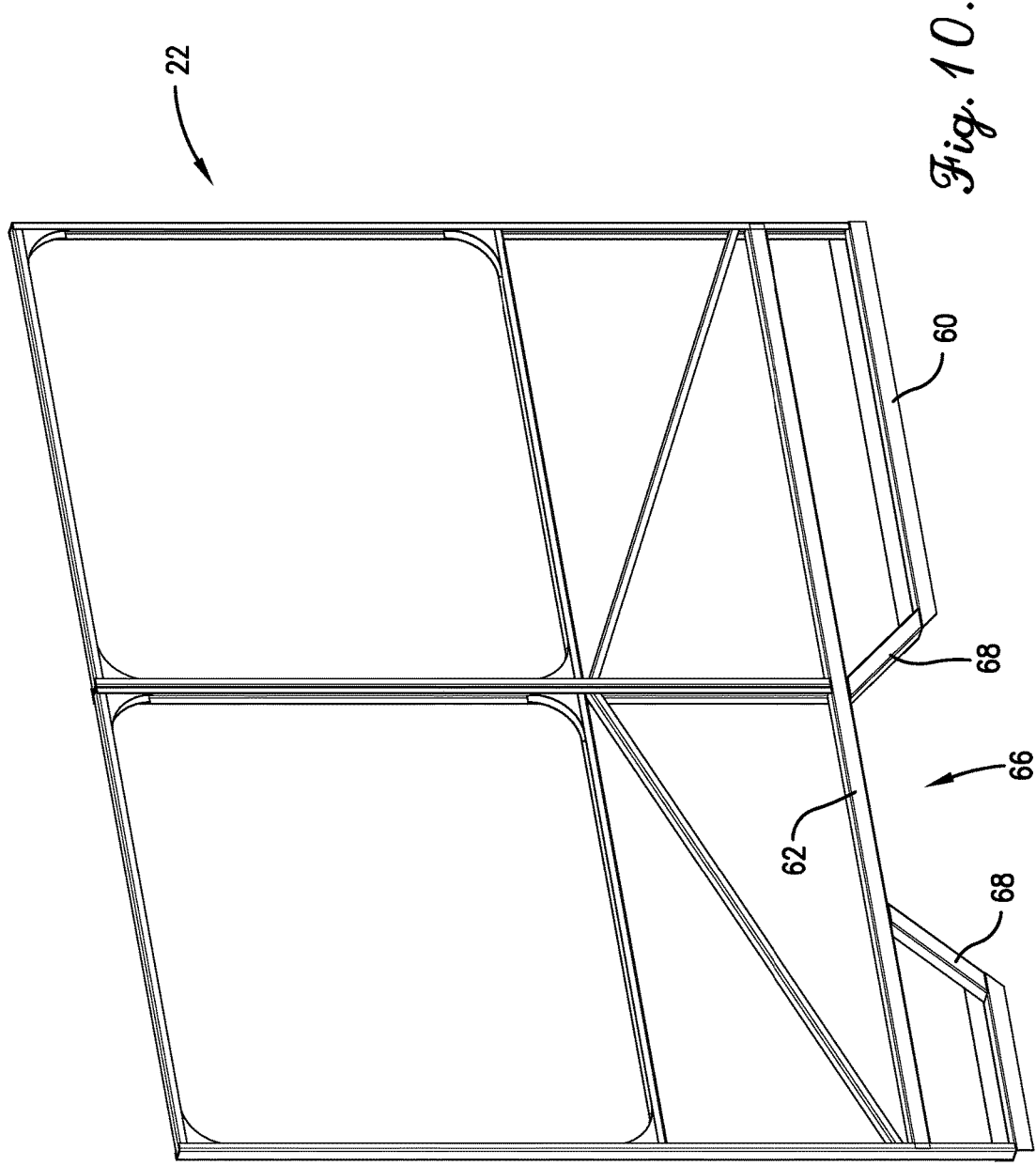

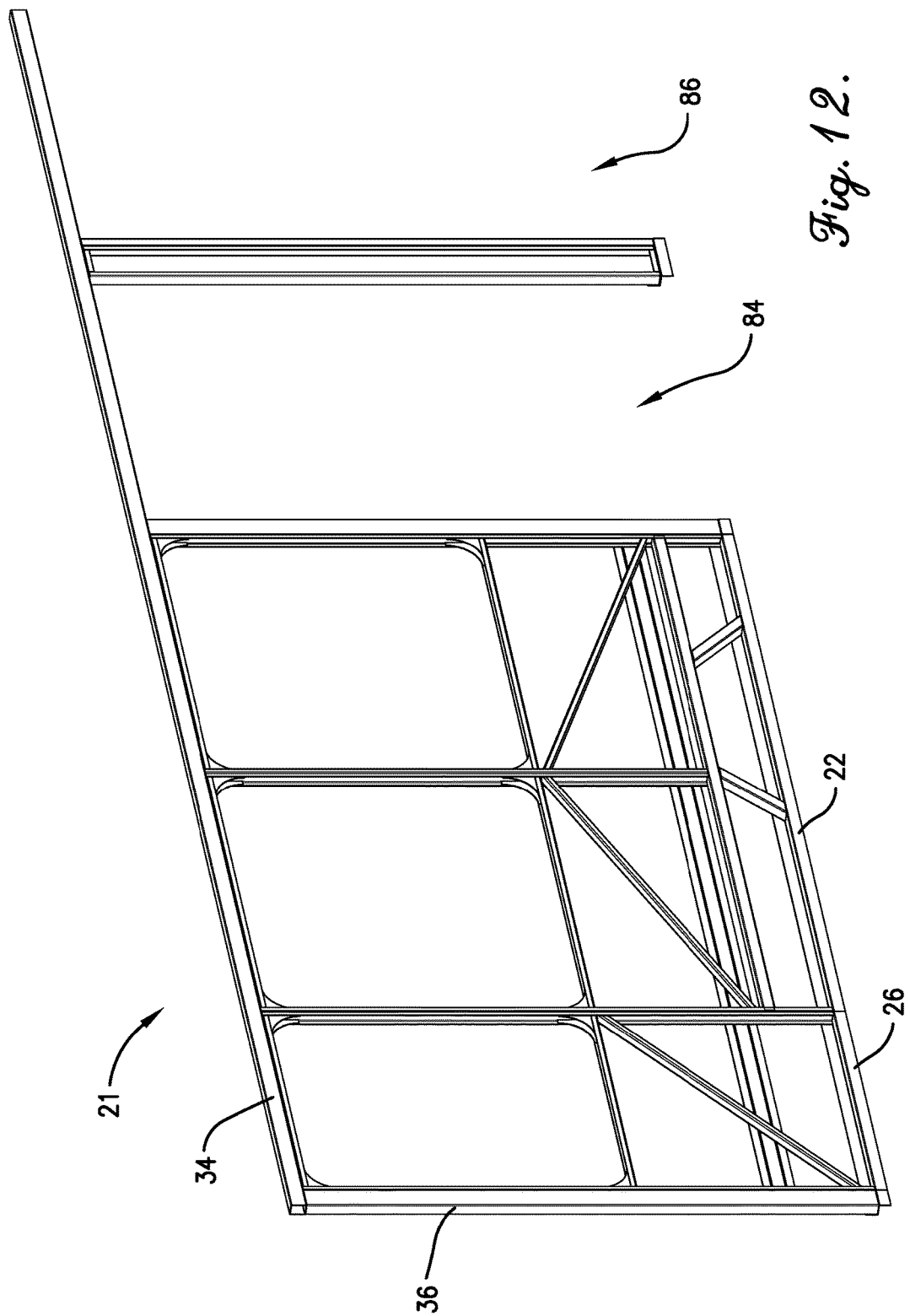

MODULAR SIDEWALL FOR PASSENGER VEHICLE

FIELD

Embodiments of the present invention generally relate to passenger vehicles. More specifically, embodiments of the present invention are directed to a modular sidewall for passenger vehicles, with certain of such modular sidewalls including seat rails.

BACKGROUND

Passenger vehicles, such as vans, shuttles, busses, and the like, are often utilized to transport passengers between geographic locations. Depending on the need, passenger vehicles can be manufactured in various sizes so as to transport various numbers of passengers. For example, common passenger vehicles have lengths anywhere between 15 and 30 feet, or more. In general, the components used to manufacture a passenger vehicle of a specific size are uniquely formed according to the specification for the particular passenger vehicle. As such, components used to manufacture a passenger vehicle of a specific size cannot be generally used in the manufacture of a passenger vehicle of a different size. For instance, a sidewall used to manufacture a 20 foot passenger vehicle would generally be specifically made for the 20 foot passenger vehicle, and would not be usable for the manufacture of a 27 foot passenger vehicle.

In addition, generally all passenger vehicles include seat rails extending along the inboard sides of vehicles' sidewalls. Such seat rails function to support the seats within the passenger compartment of the passenger vehicles. In the past such seat rails were generally difficult to manufacture and integrate with the sidewalls.

Accordingly, a need exists for a modular sidewall for passenger vehicles, with the modular sidewall including modular sections that can be configured as necessary to be incorporated as part of passenger vehicles of generally any size. In addition, there is a need for a seat rail that can be efficiently manufactured and assembled as part of passenger vehicle sidewalls.

SUMMARY

Embodiments of the present invention include a modular sidewall for a passenger vehicle. The modular sidewall comprises an outer frame, and a plurality of individual sections configured to be secured together at least partially within the outer frame. The plurality of individual sections includes a main section presenting at least one window opening configured to receive a window, and a standard section presenting at least one window opening configured to receive a window. The standard section has a width that is smaller than a width of the main section.

Embodiments of the present invention additionally include a method of manufacturing a modular sidewall for a passenger vehicle. The method comprises the initial step of providing an outer frame. The method includes the additional step of securing a plurality of individual sections together within the outer frame to form the modular sidewall. The plurality of individual sections includes a main section presenting at least one window opening configured to receive a window, and a standard section presenting at least one window opening configured to receive a window. The standard section has a width that is smaller than a width of the main section. The method further includes securing the modular sidewall to a side of the passenger vehicle.

This summary is not intended to identify essential features of the present invention, and is not intended to be used to limit the scope of the claims. These and other aspects of the present invention are described below in greater detail.

BRIEF DESCRIPTION OF THE DRAWINGS

Embodiments of the present invention are described in detail below with reference to the attached drawing figures, wherein:

FIG. 6 is a perspective view of another contracted window section from the modular sidewall from FIGS. 2-3;

FIG. 7 is a perspective view of a support section from the modular sidewall from FIGS. 2-3;

FIG. 10 is a perspective view of an additional embodiment of a main section, particularly illustrating the main section including a wheel well;

FIG. 12 is a perspective view of another modular sidewall from the passenger vehicle of FIG. 1, particularly illustrating gaps presented for receiving a door and/or a wheelchair lift.

The figures are not intended to limit the present invention to the specific embodiments they depict. The drawings are not necessarily to scale.

DETAILED DESCRIPTION

The following detailed description of embodiments of the invention references the accompanying figures. The embodiments are intended to describe aspects of the invention in sufficient detail to enable those with ordinary skill in the art to practice the invention. Other embodiments may be utilized and changes may be made without departing from the scope of the claims. The following description is, therefore, not limiting. The scope of the present invention is defined only by the appended claims, along with the full scope of equivalents to which such claims are entitled.

In this description, references to "one embodiment", "an embodiment", or "embodiments" mean that the feature or features referred to are included in at least one embodiment of the invention. Separate references to "one embodiment", "an embodiment", or "embodiments" in this description do not necessarily refer to the same embodiment and are not mutually exclusive unless so stated. Specifically, a feature, structure, act, etc. described in one embodiment may also be included in other embodiments, but is not necessarily included. Thus, particular implementations of the present invention can include a variety of combinations and/or integrations of the embodiments described herein.

Figure 1:
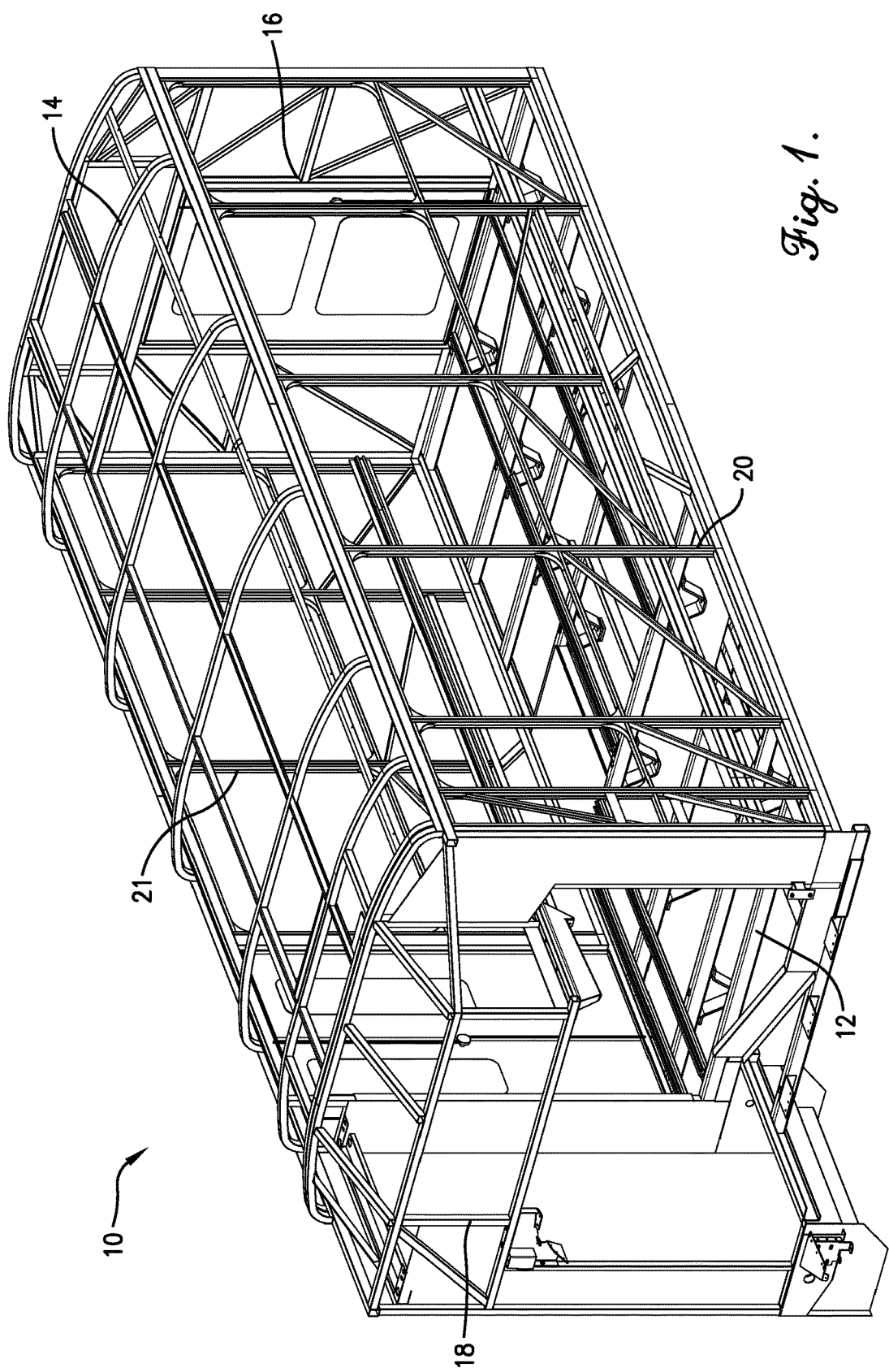
FIG. 1 is a perspective view of a structural frame of a passenger vehicle with a pair of modular sidewalls formed according to embodiments of the present invention.

Embodiments of the present invention are directed to a modular sidewall, and components thereof, for passenger vehicles. A structural frame 10 of a passenger vehicle is illustrated in FIG. 1. The structural frame 10 includes a floor subassembly 12, a roof subassembly 14, a backwall 16, a cab subassembly 18, and a pair of modular sidewalls 20, 21. As illustrated, the modular sidewalls 20, 21 extend from generally from the floor subassembly 12 to the roof subassembly 14 and from the backwall 16 to the cab subassembly 18. In some embodiments, a portion of one or more of the modular sidewalls 20, 21 may extend into the cab subassembly 18 so as to form a part of the cab subassembly 18. It should be understood that the structural frame 10 shown in FIG. 1 is provided simply for illustration, and other modular sidewall embodiments are contemplated for use with other passenger vehicles of smaller and larger sizes. Regardless, the modular sidewalls of embodiments of the present invention are configurable to be used as part of passenger vehicles of various sizes, as will be described in more detail below.

As used herein the terms "front" or "forward" refer to a direction from the backwall 16 or rear the passenger vehicle toward the cab subassembly 18 or front of the passenger vehicle, while the terms "back," "rear," or "rearward" refer to a direction from the cab subassembly 18 or front of the passenger vehicle toward the backwall 16 or rear of the passenger vehicle. Similarly, the terms "upward" or "higher" refer to a direction from the floor subassembly 12 or bottom of the passenger vehicle towards the roof subassembly 14 or top of the passenger vehicle, while the terms "downward" or "lower" refer to a direction from the roof subassembly 14 or top of the passenger vehicle to the floor subassembly 12 or bottom of the passenger vehicle. Finally, the terms "inward" or "inboard" refer to a direction towards a longitudinal centerline of the passenger vehicle, while the terms "outward" or "outboard" refer to a direction away from the longitudinal centerline of the passenger vehicle.

Figure 2:
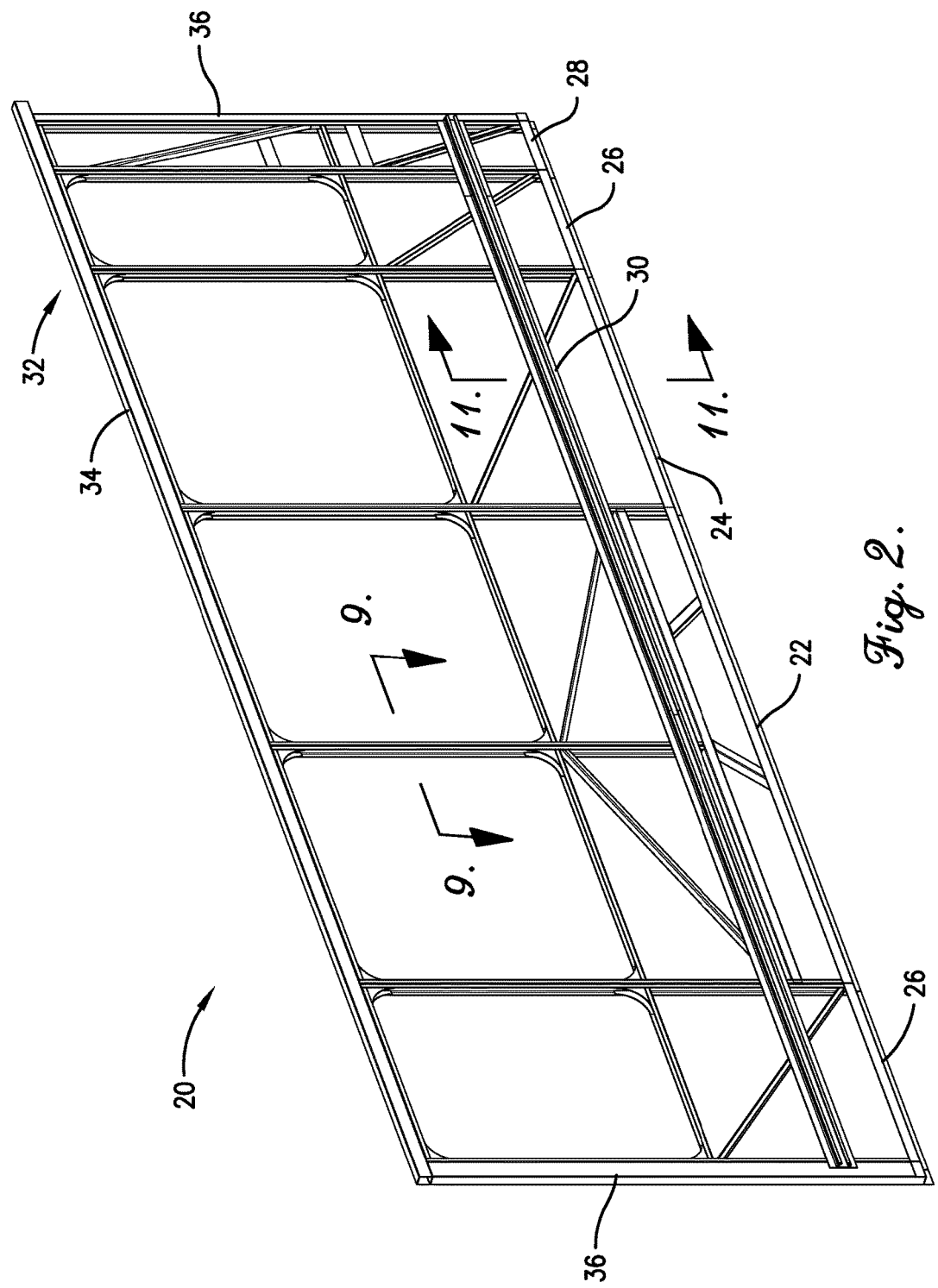
FIG. 2 is a perspective view of a modular sidewall from the passenger vehicle of FIG. 1.
Figure 3:
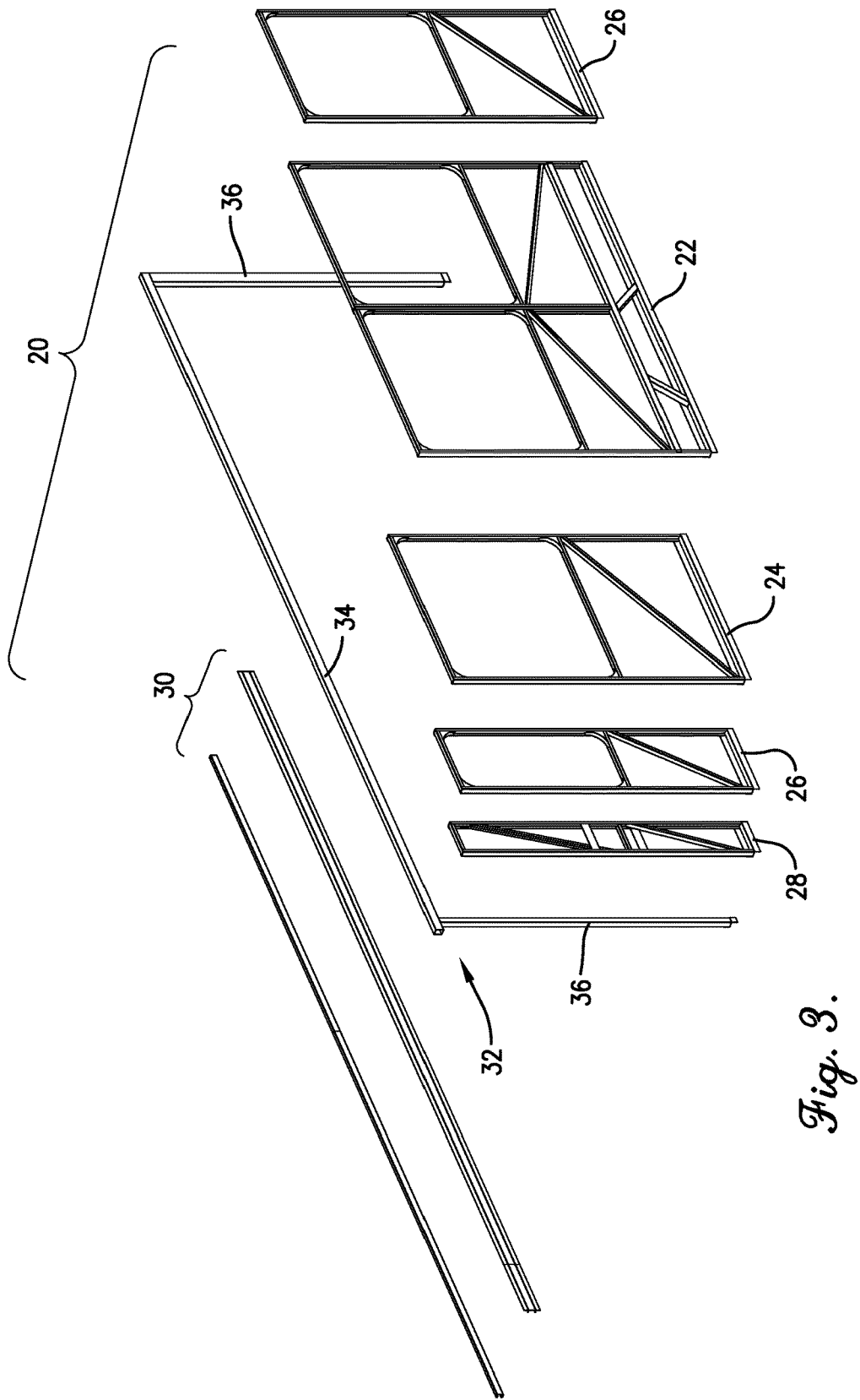
FIG. 3 is an exploded view of the modular sidewall from FIG. 2.

With reference to FIGS. 2-3, an embodiment of a modular sidewall 20 is shown in more detail. As illustrated, the modular sidewall 20 may comprise one or more individual modular sections, such as a central main section 22, one or more a standard window sections 24, one or more contracted window sections 26, and one or more support section 28. In certain additional embodiments, the modular sidewall 20 may include a seat rail 30 that extends in a generally horizontal manner across the inboard side of the individual modular sections of the modular sidewall 20. As will be described in more detail below, the individual modular sections of the modular sidewall 20 may be secured together via various methods of attachment or connection components, such as via riveting, fillet welding, and/or spot welding. In addition, the individual modular sections may be secured to an outer frame section 32 that includes a horizontally-extending top element 34 and a pair of vertically-extending side elements 36 that extend downward from ends of the top element 34. As such, the individual modular sections may be retained within the space presented between the top element 34 and the side elements 36 of the frame section 32. Although the following description provides for various components of the modular sidewall 20 to be secured together via welding or spot welding, it should be understood that embodiments may provide for other securement components to be used in place of spot welds, such as rivets, fillet welds, or the like.

Beginning with the frame section 32, as illustrated in FIG. 3, the top element 34 may be formed as an elongated section of rectangular or square steel or other metal tubing. In some embodiments, the tubing of the top element 34 may have dimensions approximately equal to 2.0×1.5 inches (i.e., width×width). A length of the top element 34 may vary depending on the size of the passenger vehicle, but in some embodiments may be between 8 and 32 feet, between 10 and 24 feet, between 12 and 20 feet, or about 16 feet, or about 18 feet. Similarly, the side elements 36 of the frame section 32 may be formed from rectangular or square steel or other metal tubing. In some embodiments, the square tubing of the side element 36 may have dimensions approximately equal to 1.5×1.5 inches (i.e., width×width). In other embodiments, the side element 36 may have dimensions approximately equal to 3.0×1.5 inches (i.e., width×width). As shown in the drawings, some embodiments may provide for the forward side element 36 to be formed from 1.5×1.5 inch steel tubing, while the rearward side element 34 may be formed from 3.0×1.5 steel tubing. A length of the side element 34 may vary depending on the size of the passenger vehicle, but in some embodiments may be between 48 and 96 inches, between 60 and 84 inches, or about 72 inches. As such, an overall height of the frame section 32 may be about 72 or 73 inches. The side elements 36 may be secured to the top element 34 by various methods of attachment, such as by riveting, fillet welding, or spot welding.

Figure 4:
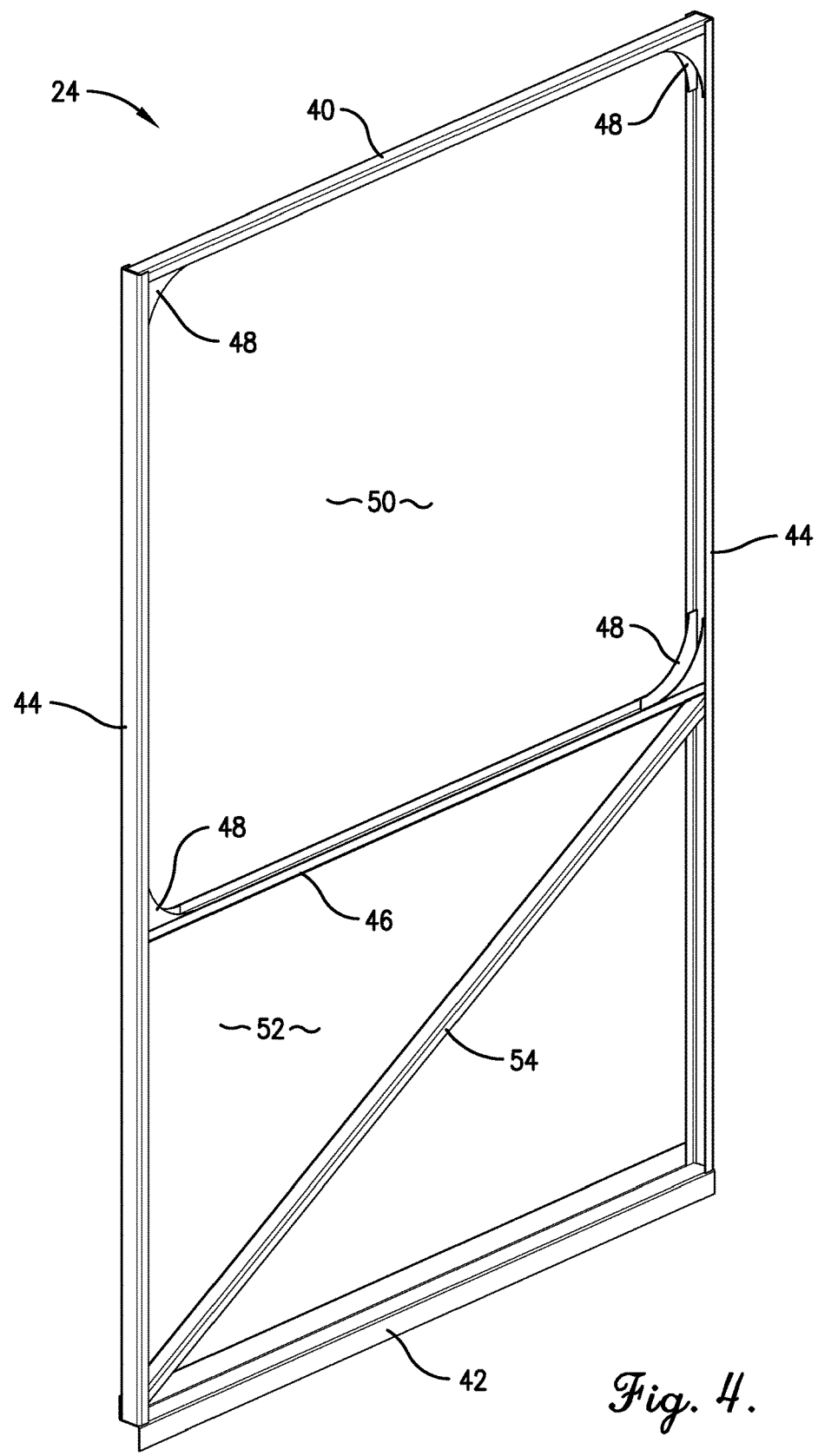
FIG. 4 is a perspective view of a standard window section from the modular sidewall from FIGS. 2-3.

Turning to the standard window section 24, as illustrated in FIG. 4, the standard window section 24 may be formed as a generally rectangular frame comprising a horizontal top element 40, a horizontal bottom element 42 and a pair of vertical side elements 44 extending between ends of the top element 40 and the bottom element 42. The top element 40 may be formed as an elongated section of steel or other metal c-channel (e.g., galvanized steel), with the channel portion of the c-channel facing downward. As used herein, the term c-channel is used to mean a section of material including a primary section presenting a width of the section, and a pair of flange sections extending in parallel and in the same direction from opposite edges of the primary section. As such, the c-channel can present a channel between the primary section and flange sections. In some embodiments, the top element 40 may have dimensions approximately equal to 1.25×0.75 inches (i.e., width×flange lengths). The top element 40 of the standard window section 24 may be formed with various lengths; however, certain embodiments may provide for the lengths to be between 24 and 72 inches, between 36 and 60 inches, or about 48 inches. In some embodiments, the top element 40 of the standard window section 24 may be formed in a generally standard size of about 48 inches.

The bottom element 42 of the standard window channel may be formed as an elongated section of steel or other metal z-channel (e.g., galvanized steel). As used herein, the term z-channel is used to mean a section of material including a primary section presenting a width of the section, and a pair of flange sections extending in parallel but in opposite directions from opposite edges of the primary section. With reference to FIG. 4, the upward-extending flange element of the bottom element 42 may be positioned on an inboard side of the standard window section 24 (also illustrated in FIG. 2), while the downward-extending flange element of the bottom element 42 may be positioned on an outboard side of the standard window section 24. In some embodiments, the z-channel of the bottom element 42 may have dimensions approximately equal to 1.5×1.5×1.5 inches (i.e., width× upward-extending flange length×downward-extending flange length). The bottom element 42 of the standard window section 24 may be formed with a length that generally corresponds with or is equal to the top element 40. In some embodiments, the bottom element 42 of the standard window section 24 may be formed in a standard size of about 48 inches.

The side elements 44 of the standard window section 24 may be formed as elongated sections of steel or other metal c-channel (e.g., galvanized steel), with the channel portions of the c-channels facing inwards towards each other. In some embodiments, the side elements 44 may have dimensions approximately equal to 1.5×0.75 inches (i.e., width×flange lengths). The side elements 44 of the standard window section 24 may be formed with various lengths; however, certain embodiments may provide for the lengths to be between 48 and 120 inches, between 60 and 108 inches, or about 72 inches. In some embodiments, the bottom element 42 of the standard window section 24 may be formed in a generally standard size of about 72 inches.

The above-described, individual elements of the standard window section 24 may be secured together to form the rectangular frame by welding (e.g., fillet welds or spot welds) or riveting ends of the elements together. Specifically, ends of the top element 40 may be welded to the upper ends of the side elements 44. Because the top element 40 may be formed with a smaller width than the side elements 44 (e.g., 1.25 inches versus 1.5 inches), the ends of the top element 40 may be received within the channels of the side elements 44 and welded therein. The lower ends of the side elements 44 may be positioned against the upper surface of the primary section of the z-channel of the bottom element 42 and welded to the ends of the bottom element 42.

In some embodiments, the standard window section 24 may further include a horizontally-extending center element 46 that extend between the side elements 44 and is positioned below the top element 40 and above the bottom element 42. In some embodiments, the center element 46 may be formed as an elongated section of steel or other metal c-channel, with the channel facing upward towards the top element 40. In some embodiments, the center element 46 may have dimensions approximately equal to 1.25×0.75 inches (i.e., width×flange lengths). The center element 46 of the standard window section 24 may be formed with a length that generally corresponds with the length of the top element 40. In some embodiments, the center element 46 of the standard window section 24 may be formed in a generally standard size of about 48 inches. The ends of the center element 46 may be welded to the side elements 44 at a position along the lengths of the side elements 44. Because the center element 46 may be formed with a smaller width than the side elements 44 (e.g., 1.25 inches versus 1.5 inches), the ends of the center element 46 may be received within the channels of the side elements 44 and welded therein. In certain embodiments, the one or more gusset plates 48 may be used to increase the strength of the connection between the center element 46 and the side elements 44. Similarly, gusset plates 48 may be used to increase the strength of the connection between the top elements 40 and the side elements 44. Such gusset plates 48 may be welded in place to the elements of the standard window section 24.

The center element 46 may be positioned about midway between the length of the side elements 44 so as to separate an interior space of the frame of the standard window section 24 into a window opening 50 and a lower opening 52. The window opening 50 comprises an open area that extends between the center element 46 and the top element 40 (and between the side elements 44) and is configured to receive a window for the passenger vehicle. Specifically, in some embodiments, the windows may be securely received in the window opening 50 within the channels presented by the top element 40, the side elements 44, and the center element 46. The center element 46 need not be positioned precisely midway between the lengths of the side elements 44. For instance, the center element 46 may be positioned closer to the bottom element 42 than the top element 40, so as to present a larger window opening 50. For example, the primary section of the center element 46 may be positioned about 42 inches below the top element 40, such that the window opening 50 has a vertical length of approximately 40.5 inches. The lower opening 52 comprises an open area that extends between the center element 46 and the bottom element 42 (and between the side elements 44). In some embodiments, the center element 46 may be position about 30 inches above the lower primary section of the bottom element 42, such that the lower opening 52 has a vertical length of approximately 30 inches.

In certain embodiments, the standard window section 24 may also include an angled support element 54 that extends within the lower opening 52 at angle between the side elements 44. The support element 54 may be used to increase the strength of the standard window section 24. In some embodiments, the support element 54 may be formed from steel or other metal rectangular or square tubing (e.g., galvanized steel). For instance, the support element 54 may be formed with dimensions approximately 1.25×1.25 (i.e., width×width). In more detail, the support element 54 may extend from a bottom corner of the lower opening 52 (at a position approximate to where a lower end of a side element 44 is connected to an end of the bottom element 42) to a top corner of the lower opening 52 (at a position approximate to where an end of the center element 46 is connected to one of the side elements 44). As such, in some embodiments, the support element 54 may extend at approximately a 30 degree angle with respect to horizontal. Because the support element 54 may be formed with a smaller width than the side elements 44 (e.g., 1.25 inches versus 1.5 inches), the ends of the support element 54 may be received within the channels of the side elements 44 and welded therein.

Beneficially, embodiments of the present invention provide for the standard window section 24 to be manufactured in an efficient manner. Specifically, the c-channel and z-channel elements may be manufactured from stock sheet metal in a metal-rolling process. Specifically, the generally flat stock sheet metal may pass through a rolling mill to re-form the sheet metal into the specific shapes required (e.g., c-channels or z-channels). In some embodiments, the sheet metal may comprise sheets of galvanized steel having a thickness of about 0.06 inches. Nevertheless, it should be understood that the stock sheet metal may have other thicknesses, and/or may be formed from other materials. Once the elements have been formed, the elements may be secured together as previously described to manufacture the standard window section 24. Although the above description illustrated certain of the elements of the standard window section 24 being formed from c-channels or z-channels, it should be understood that elements of other shapes/configurations may be used, such as square or rectangular tubing.

Figure 5:
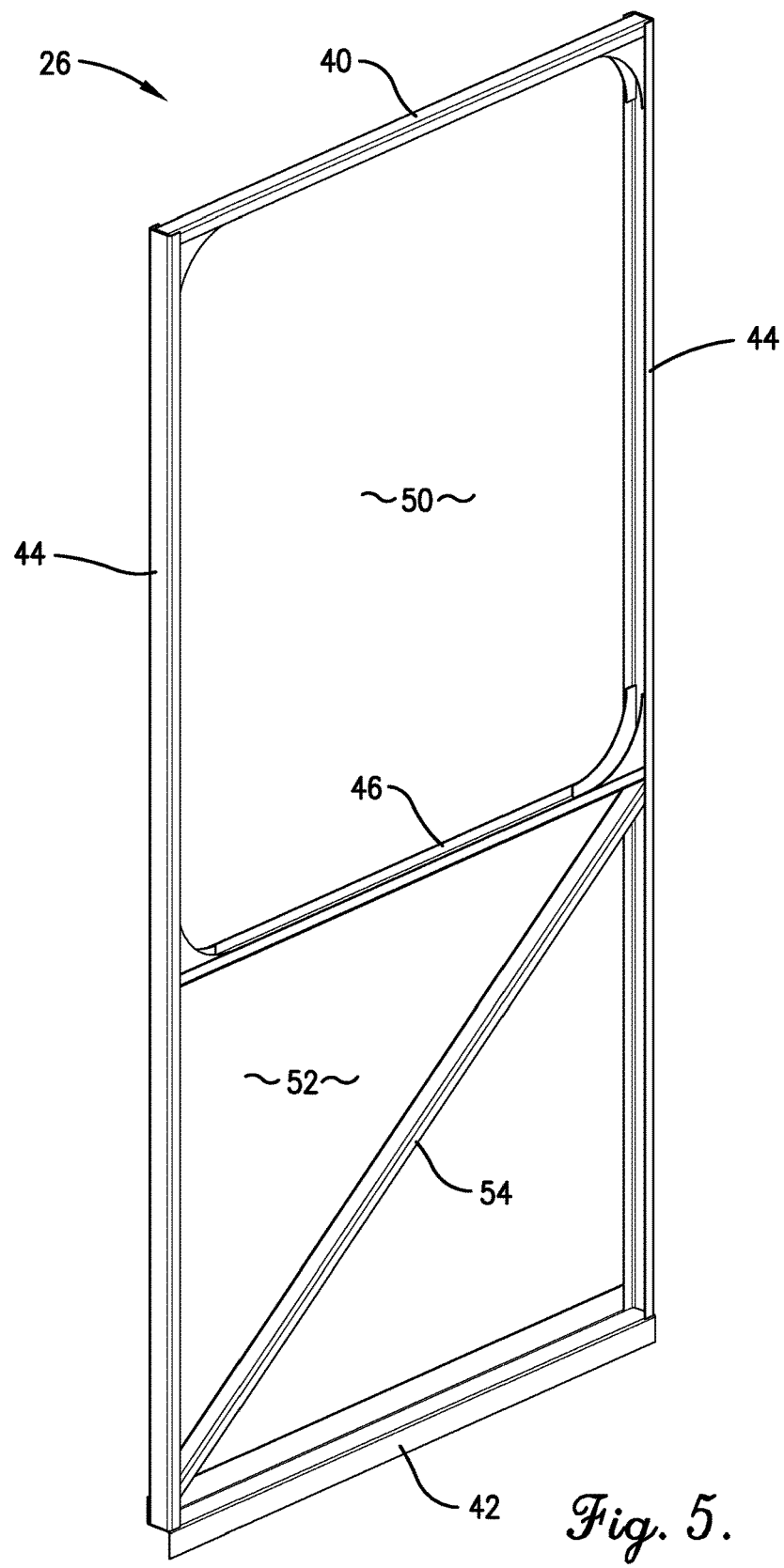
FIG. 5 is a perspective view of a contracted window section from the modular sidewall from FIGS. 2-3.

Turning to FIGS. 5 and 6, examples of contracted window sections 26 are illustrated. The contracted window sections 26 may include the same general elements as the standard window section 24, including a top element 40, a bottom element 42, a pair of side elements 44, a center element 46, and a support element 54. The side elements 44 of the contracted window sections 26 may have lengths generally equal to those of the side elements 44 of the standard window section 24, such that the contracted window sections 26 have generally the same height as the standard window section 24. However, in some embodiments, the contracted window sections 26 may be formed with a width that is less than the width of the standard window section 24. For instance, each of the top element 40, the bottom element 42, the center element 46, and the support element 54 of the contracted window sections 26 may be shorter than the corresponding elements in the standard window section 24. For instance, as illustrated in FIG. 5, in some specific embodiments, the top element 40, the bottom element 42, and the center element 46 may have lengths that are about 36 inches. As such, the contracted window sections 26 may have a width of approximately 36 inches. As such, the support element 54 may be positioned so as to form a 38 degree angle with respect to horizontal. In other embodiments, as illustrated in FIG. 6, the top element 40, the bottom element 42, and the center element 46 may have lengths that are about 20 inches. As such, the contracted window sections 26 may have a width of approximately 20 inches. As such, the support element 54 may be positioned so as to form a 55 degree angle with respect to horizontal. Nevertheless, it should be understood that, in certain embodiments, the contracted window sections 26 may have widths other than 36 or 20 inches. With the contracted window sections 26 having shorter widths than the standard window section 24, the window openings 50 of the contracted window sections 26 may have a correspondingly-shorter width, such that shorter windows may be used within the contracted window sections 24. It should be understood however, that the heights of the window openings 50 of the contracted window sections 26 may generally correspond with the height of the window opening of the standard window section 24, such that the heights of the windows within the contracted window sections 26 will be generally the same as the height of the windows within the standard window section 24.

Turning to FIG. 7, an example of the support section 28 is illustrated. The support section 28 may include the same general elements as the standard window section 24, including a top element 40, a bottom element 42, a pair of side elements 44, a center element 46, and a support element 54. The side elements 44 of the support section 28 may have lengths that are generally the same as the side elements 44 of the standard window section 24, such that the support section 28 has generally the same height as the standard window section 24. However, in some embodiments, the support section 28 may be formed with a width that is smaller than the width of the standard window section 24 and/or of the contracted window sections 26. Specifically, each of the top element 40, the bottom element 42, the center element 46, and the support element 54 of the support section 28 may be shorter than the corresponding elements in the standard window section 24. For instance, in some specific embodiments, the top element 40, the bottom element 42, and the center element 46 may have lengths approximately 10 inches. Nevertheless, it should be understood that, in certain embodiments, the support sections 28 may have widths other than 10 inches. In addition, in some embodiments, the support sections 28 may not generally include windows incorporated therein. As such, the window openings 50 of the support sections 28 may have an additional support element 54 extending diagonally therethrough. Such support elements 54 may be positioned so as to form a 69 degree angle with respect to horizontal. Furthermore, in some embodiments, the support sections 28 may have one or more horizontally-extending connecting elements 58 extending between the side elements 44, with such connecting elements 58 being used to increase the strength of the support section 28.

Figure 8:
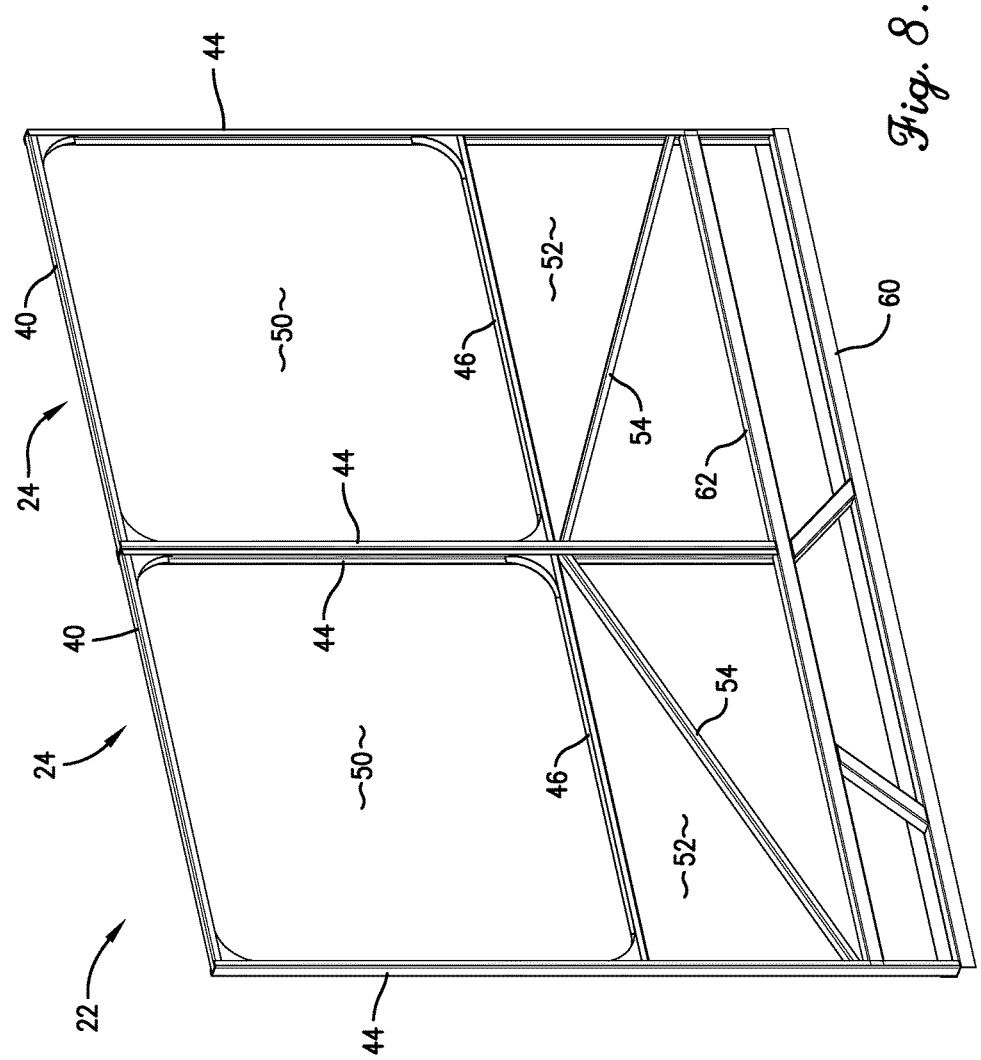
FIG. 8 is a perspective view of a main section from the modular sidewall from FIGS. 2-3.

Turning now to the main section 22, as illustrated in FIG. 8, the main section 22 may be comprised generally of a pair of standard window sections 24 that are coupled together. As such, the main section 22 may have a height that generally corresponds with the height of the standard window sections 24 (e.g., 72 inches) and a width that is generally twice the width of the standard window sections 24 (e.g., 96 inches). A pair of standard window sections 24 may be coupled together to form the main section 22 by positioning one of the side elements 44 from a first standard window sections 24 adjacent to one of the side elements 44 from a second standard window sections 24. Specifically, the exterior-facing surfaces of the primary elements of the c-channels (i.e., the surfaces opposite the channels) of the side elements 44 from the pair of standard window sections 24 may be positioned adjacent to each other such that the exterior-facing surfaces are in contact with each other. As such, the standard window sections 24 may be secured together by spot welding (or, alternatively, fillet welding or riveting) the side elements 44 together, as is illustrated by the spot weld 59 of shown in FIG. 9. As is commonly known, spot welding is a process of joining two pieces of material by heating the material via an applied electric current. The heat generated by the electric current passing through the two pieces of material will melt the material, so as to join the material together in the form of a weld when the melted material cools and solidifies. The main section 22 may include a plurality of spot welds (e.g., every four inches) along the lengths of the adjacent side elements 44 of the standard window sections 24 so as to secure the standard window sections 24 together.

In some embodiments, however, the main section 22 may not include a pair of bottom elements 42, as would generally be included in a pair of standard window sections 24. Instead, the main section 22 may include a single bottom element 60 that extends horizontally between the outer side elements 44 of the adjacent standard window sections 24. As with the bottom elements 42, the bottom element 60 may comprise an elongated section of steel or other metal z-channel (e.g., galvanized steel), with uppermost extending portion of the bottom element 42 positioned on an inboard side of the main section 22. In some embodiments, the z-channel may have dimensions approximately equal to 1.5×1.5×1.5 inches (i.e., width×upward-extending flange length×downward-extending flange length). The bottom element 60 of the main section 22 may be generally formed with a length that generally corresponds with, or is equal to, the overall width of the main section 22 (e.g., about 96 inches). In some embodiments, the main section will also include a horizontally-extending base element 62 that extends between the outer side elements 44 of the adjacent standard window sections 24. The base element 62 may comprise a section of rectangular or square steel or other metal tubing (e.g., galvanized steel). The base element 62 may have dimensions of approximately 1.5×1.5 inches (i.e., width×width). The base element 62 may be secured to each of the outer side elements 44 via weld. The base element 62 may be spaced above the bottom element 60 between 4 and 12 inches, between 5 and 10 inches, or about 6 inches. To facilitate such positioning of the base element 62, lower ends of the inner side elements 44 of the adjacent standard window sections 24 may only extend down as far as the base element 62, such that the side elements 44 do not extend below the base element 62. In such embodiments, the lower ends of the inner side elements 44 may be welded to an upper surface of the base element 62. Furthermore, each of the angled support elements 54 that extend through the lower openings 52 may extend from the base element 62 (adjacent a position where the base element 62 is connected to an outer side element 44) upwards at an angle of about 23 degrees to the connection between the center element 46 and an interior side element 44.

As shown in FIG. 8, the bottom element 60 of the main section 22 may be a unitary piece of material. Such a main section 22 may be used as a modular wall section 20 on a passenger vehicle that does not include a wheel well. However, as shown in FIG. 10, certain embodiments of the present invention provide for a main section 22 that includes a wheel well 66 configured to providing a receiving area for a wheel of the passenger vehicle. The wheel well 66 may be formed by removing a portion of the bottom element 60 and providing for two angled extension pieces 68 to extend up from the bottom element 60 to the base element 62. As such, a wheel well 66 can be formed, which is configured to receive a wheel of the passenger vehicle. In some embodiments, the wheel well may have a width of between 24 and 60 inches, between 32 and 48 inches, about 36 inches, or about 48 inches.

Finally, turning now to the seat rail 30, as shown in FIGS. 2-3, the seat rail 30 may extend generally horizontally across the inboard side of the modular sidewall 20. The seat rail 30 may be positioned just above the base element 62 and secured, via welds, to the inboard portions of the side elements 44 of each of the sections of the modular sidewall 20. As shown in the drawings, the ends of the seat rail 30 may be secured to the inboard portions of the side elements 36 of the frame section 32. As such, a length of the seat rail 30 may correspond with, or be generally equal to, the overall length of the modular sidewall 20 (e.g., between 8 and 32 feet, between 10 and 24 feet, between 12 and 20 feet, or about 16 feet, or about 18 feet), as dependent on the length of the passenger vehicle. Although the following description of the seat rail 30 describes the use of spot welding or welding in general, it should be understood that other securement components may be used in place of spot welding, such as fillet welding, riveting, or the like.

Figure 11:
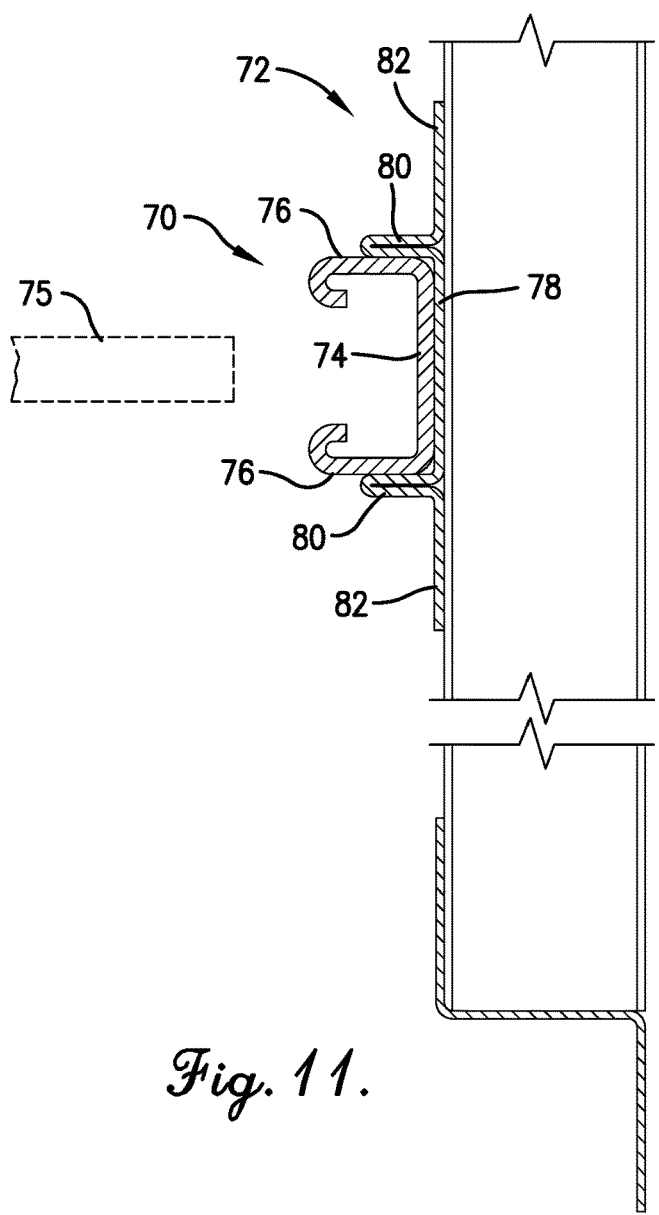
FIG. 11 is a cross section taken along the line 11-11 from FIG. 2, particularly illustrating a seat rail from the modular sidewall.

As perhaps best shown in FIG. 11, the seat rail 30 may comprise a strut channel 70 secured to a strut support 72. The strut channel 70 may be formed as a generally continuous section of steel or other metal and may include a primary section 74 and a pair of flange sections 76 extending generally orthogonally from the edges of the primary section 74 so as to present a channel for receiving a seat support element 75 of a seat (not shown). Specifically, seats in passenger vehicles are generally provided in pairs so as to include an inboard seat and an outboard seat, which are interconnected or integrally formed. Often, a support components extends upward from the floor to a bottom surface of the inboard seat, so as to at least partially secure the seats in place. In addition, the outboard seat often includes seat support element 75 that extends in an outboard direction, such that the seat support element 75 can be received within the channel presented by the strut channel 70 of the seat rail. In some embodiments, the seat support element 75 may be secured in place within the strut channel 70 via various methods of securement, such as nut and bolt combinations, welding, and the like. In some embodiments of the present invention, the flange sections 76 may be formed with inwards-curving lips to provide additional stiffness to the strut channel 70 and to act as interference elements for maintaining the seat support elements 75 of the passenger vehicle's seats within the channel. The strut channel 70 maybe formed in various sizes, depending on the requirements of the passenger vehicle; however, in some embodiments, the primary section 74 may have a width between 1 and 3 inches, between 1.25 and 2 inches, or about 1.6 inches. The flange sections 76 may extend from the primary element to form a length between 0.25 and 2 inches, between 0.5 and 1 inches, or about 0.9 inches. In some embodiments, the strut channel 70 may be formed by rolling a sheet of galvanized steel having a thickness of about 0.1 inches through a roll mill; although other thicknesses may be used.

The strut support 72 may be formed as a continuous section of material that comprises a primary section 78, a pair of double-hum flange sections 80 extending generally orthogonally from the edges of the primary section 78 so as to present a channel, and a pair of end section 82 that extend from the flange sections 80 in a direction generally coplanar with the primary section 78. In some embodiments, the strut support 72 may be formed by rolling a sheet of galvanized steel having a thickness of about 0.08 inches through a roll mill; although other thicknesses may be used. As shown in the drawings, the double-hum flange sections 80 may be formed as a folded section of material, with the folded portions of the section being folded upon themselves so as to be positioned adjacent to and in contact with each other in an overlapping fashion. In some embodiments, the primary section 78 of the strut support 72 may be at least nominally larger than the primary section 74 of the strut channel 70. For instance, the primary section 78 may have a width between 1 and 3 inches, between 1.25 and 2 inches, or about 1.7 inches. The flange sections 76 may extend from the primary element 74 to form a length between 0.25 and 2 inches, between 0.5 and 1 inches, or about 0.7 inches. The end sections 82 may extend a length of between 0.5 and 1.5 inches, between 0.75 and 1.25 inches, or about 1 inch.

As such, the strut channel 70 may be configured to be received within the channel presented by the strut support 72. The strut channel 70 may be secured to the strut support 72 by positioning the exterior-facing surface of the primary section 74 of the strut channel 70 (i.e., the surface opposite the channel of the strut channel 70) into engagement with the channel-presenting surface of the primary section 78 of the strut support 72. In such a position, the flange sections 80 of the strut support 72 may overlap at least portions of the exterior-facing surfaces of the flange sections 76 of the strut channel 70. In some embodiments, the flange sections 80 may overlap at least 50 percent, at least 60 percent, at least 70 percent, at least 75 percent, at least 80 percent, or at least 90 percent of the exterior-facing surfaces of the flange sections 80 of the strut channel 70. The strut channel 70 can be held in such a position via a plurality of spot welds located along the length of the seat rail 30, with each extending through the adjacent primary sections 74, 78 of the strut channel 70 and the strut support 72. For example, in some embodiments, the seat rail 30 may include spots welds every 4 inches along the length of the seat rail 30. With the seat rail 30 assembled as such described, the seat rail 30 can be secured to the sections of the modular sidewall 20 as was previously described.

The modular sidewalls described above can beneficially be configured to act as sidewalls of passenger vehicles of various sizes. For example, the modular sidewall 20 illustrated in FIG. 2 can be used as part of the frame 10 of the passenger vehicle illustrated in FIG. 1. The modular sidewall 20 of FIG. 2 includes a main section 22, one standard window section 24, two contracted window sections 26 (one contracted window section 26 having a smaller width than the other), and one support section 28. Such sections are secured to each other and secured to the frame section 32, which includes the top element 34 and side elements 36. As such, the modular sidewall 20 of FIG. 2 has a length approximately equal to the total widths of each of the sections, i.e., 96 inches—main section 22; 48 inches—standard window section 24; 36 inches—contracted window section 26; 20 inches—contracted window section 26; 10 inches—support section 28. As such, the total length of the modular sidewall 20 of FIG. 2 is approximately 210 inches (i.e., 96 inches+48 inches+36 inches+20 inches+10 inches). Thus, the modular sidewall 20 illustrated in FIG. 2 may be used on a passenger vehicle manufactured with a passenger compartment that is about 17 or 18 feet in length.

Beneficially, however, embodiments provide for the modular sidewall 20 of the present invention to be used on passenger vehicles of different seizes (i.e., having passenger compartments of different sizes). In more detail, the specific configuration of the sections of the modular sidewall 20 can be reconfigured, added to, and/or subtracted from. For example, if it is required that the modular sidewall 20 is to be used on a passenger vehicle with a passenger compartment that is longer than 17 or 18 feet, then one or more additional sections can be added to the modular sidewall 20 so as to increase the length of the modular sidewall 20. As a specific example, a second standard window section 24 (i.e., having a width of 48 inches) may be added to the modular sidewall 20 so that the modular sidewall 20 can be used on a passenger vehicle with a passenger compartment having a length of 21 or 22 feet (it being understood that the top element 34 of the frame section 32 may need to be correspondingly lengthened). Alternatively, if it is required that the modular sidewall 20 is to be used on a passenger vehicle with a passenger compartment that is shorter than 17 or 18 feet, then one or more of the sections can be removed from the modular sidewall 20 so as to decrease the length of the modular sidewall 20. As a specific example, a contracted window section 26 (i.e., having a width of 36 inches) may be removed from the modular sidewall 20 so that the modular sidewall 20 can be used on a passenger vehicle with a passenger compartment having a length of 14 or 15 feet (it being understood that the top element 34 of the frame section 32 may need to be correspondingly shortened).

However, it should be understood that such above-provided examples are purely exemplary, and embodiments of the present invention may incorporate generally any configuration of individual sections within the modular sidewall of embodiments of the present invention. Broadly, the modular sidewall of embodiments of the present invention may include at least the main section 22 and one or more additional sections selected from: the standard window sections 24, the contracted window sections 26, and/or the support sections 28.

In addition to configuring the modular sidewall of embodiments of the present invention in a specific manner so as to be used on a passenger vehicle of a specific size, certain individual sections of the modular sidewall may not be included so as make room for additional components of the passenger vehicle, such as entry door and wheelchair lift. For example, as shown in FIG. 12, the modular sidewall 21 includes a main section 22; however, as opposed to the modular sidewall 20 of FIG. 2, the modular sidewall 21 of FIG. 12 excludes a standard window section 24 in place of an entry door opening 84 that can be used to receive a door that provides access to and egress from the passenger compartment of the passenger vehicle. In addition, the modular sidewall 21 of FIG. 12 excludes a contracted window section 26 and a support section 28 (e.g., as are included on the modular sidewall 21) so as to provide lift opening 86 that is configurable to receive a wheelchair lift that permits handicapped user to enter and egress from the passenger compartment of the passenger vehicle. Thus, the specific arrangement of individual sections of the modular sidewall of the present invention can be arranged so as to form a modular sidewall of a specified length, and furthermore, the modular nature of the individual sections provides for one or more individual sections to not be included in the modular sidewalls so as to leave appropriate space for the integration of various components of the passenger vehicle, such as doors, wheelchair lifts, etc.

When the particular configuration of the modular sidewall 20 is determined, the modular sidewall 20 can be assembled. Specifically, beginning with the frame section 32, individual sections may be secured to the frame section 30 in a sequential manner. For example, it may be beneficial to start with a first end of the modular sidewall 20 and add the sections one by one from the first end of the modular sidewall 20 to a second end. With reference to FIG. 2, the left-most contracted window section 26 may be first secured to the frame section 32. In some embodiments, such securement may be performed via spot welds, as was previously described. Beneficially, because the contracted window sections 26 are formed, at least in part, from steel or other metal c-channels, such spot welding may be efficiently accomplished. For instance, the exterior-facing surface of the outer side element 44 of the contracted window section 26 may be positioned adjacent to the side element 36 of the frame section 32. With such a placement, the outer side element 44 of the contracted window section 26 may be secured to the side element 36 of the frame section 30 via a plurality of side welds positioned along the length of the side element 44. In some embodiments, such spot welds may be positioned about every four inches. Next, the top element 40 of the contracted window section 26 may be secured to the top element 34 of the frame section 32. The exterior-facing surface of the top element 40 of the contracted window section 26 may be positioned adjacent to the bottom surface of the top element 34 of the frame section 32. With such a placement, the top element 40 of the contracted window section 26 may be secured to the top element 34 of the frame section 32 by a plurality of spot welds positioned along the length of the top element 40. In some embodiments, such spot welds may be positioned about every four inches or so.

Figure 9:
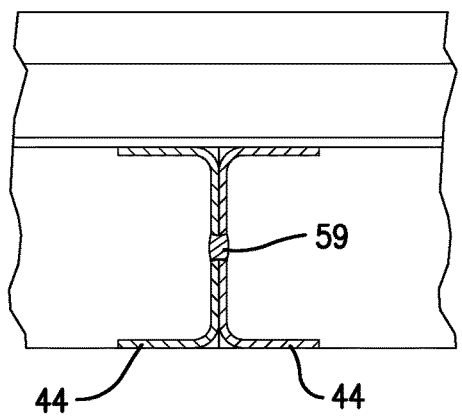
FIG. 9 is a cross section taken along the line 9-9 from FIG. 2, particularly illustrating a spot weld connecting side elements from sections of the modular sidewall.

With the first individual element (i.e., the contracted window section 26) of the modular sidewall 20 being secured in place, the remaining individual elements may be secured in place in a similar manner. With specific reference to FIG. 2, the main section 22 may next be secured in place, followed by the standard window section 24, followed by the second contracted window section 26, and finally followed by the support section 28. Beneficially, the sections of the modular sidewall 20 may be secured to each other in an efficient manner. Specifically, because the exterior-facing surfaces of the side elements 44 of adjacent sections will be in contact with each other (as shown in FIG. 9), spot welds can be used to efficiently secure the individual elements together. In some embodiments, spot welds can be used about every 4 inches along the lengths of the side elements 44 being joined together.

Upon the individual sections of the modular sidewall 20 being secured together, the seat rail 30 may be finally added to the inboard side of the modular sidewall 20 as previously discussed. The exterior-facing sides of the primary section 78 (i.e., the sides opposite the channel presented by the strut support 72) and of the end sections 82 provide a large surface area for securement of the strut support 72 to the sections of the modular sidewall 20. In some embodiments, the seat rail 30 will be secured to the inboard sides of the side elements 44. To accomplish such, one or more spot welds may be used to secure the end sections 82 to the side elements 44, where aligned with the side elements 44. Beneficially, the flange sections 80 of the strut support, by overlapping the flange sections 76 of the strut channel 70, are configured to support the strut channel 70 securely within the channel presented by the strut support 72. Thus, when a seat support element 75 of a seat (not shown) that is included in the passenger vehicle is inserted within the channel presented by the strut channel 70, the strut channel 70 supports the seat support element 75 in position, while the inward-curving lips function to retain the seat support element 75 within the channel. Beneficially, because the flange sections 80 of the strut support 72 overlap the flange sections 76 of the strut channel 70, the flange sections 80 function to provide additional support and stability to the strut channel 70. For instance, a greater amount of downward force can be applied to the strut channel, via seat support element 75, without the strut channel 70 bending or separating away from the modular sidewall 20. The large surface area provided by the end sections 82 also provide an enhanced connection to and stability of the seat rail 30.

After the modular sidewall 20 has been constructed, the modular sidewall 20 can be secured to the passenger vehicle. Returning to FIG. 1, the modular sidewall 20 can be secured in position on the driver-side of the passenger vehicle. Specifically, the bottom elements 42 of each of the sections (e.g., main section 22, standard window section 24, contracted window sections 26, and support sections 28) of the modular sidewall 20 can be welded to the floor subassembly 12. The side elements 36 of the frame section 32 can be secured, via welding, to the respective backwall 16 and cab subassembly 18 of the passenger vehicle. Finally, the top element 34 of the frame section 32 can be secured, via weld, to the roof subassembly 14. The modular sidewall 21 may be secured to the curb-side of the passenger vehicle in a similar manner. Beneficially, with the modular sidewall 21 on the curb-side, the doors and the wheelchair lift are accessible for loading and unloading of passengers.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A modular sidewall for a passenger vehicle, said modular sidewall comprising:
an outer frame; and
a plurality of individual frame sections configured to be secured together at least partially within said outer frame, wherein said plurality of individual frame sections includes
a main frame section presenting at least one window opening configured to receive a window, and
a standard frame section presenting at least one window opening configured to receive a window,
wherein said standard frame section has a width that is smaller than a width of said main frame section.

2. The modular sidewall of claim 1, wherein said plurality of individual frame sections further comprises a contracted frame section presenting at least one window opening configured to receive a window, wherein said contracted frame section has a width that is smaller than the width of said standard frame section.

3. The modular sidewall of claim 2, wherein said plurality of individual frame sections further comprises a support frame section, wherein said support frame section is not configured to receive a window, wherein said support frame section has a width that is smaller than the width of said contracted frame section.

4. The modular sidewall of claim 1, wherein said plurality of individual frame sections are secured to said outer frame via one or more connection components, wherein said connection components are selected from rivets, fillet welds, and spot welds.

5. The modular sidewall of claim 1, wherein said plurality of individual frame sections are secured to each other via one or more connection components, wherein said connection components are selected from rivets, fillet welds, and spot welds.

6. The modular sidewall of claim 1, wherein each of said plurality of individual frame sections comprises a top element, a bottom element, and a pair of side elements extending between said top element and said bottom element.

7. The modular sidewall of claim 6, wherein said top element and said side elements are formed from c-channel.

8. The modular sidewall of claim 7, wherein the c-channels are rolled from sheets of metal.

9. The modular sidewall of claim 6, wherein said bottom element is formed from metal z-channel.

10. The modular sidewall of claim 6, wherein each of said plurality of individual frame sections further comprises a center frame element extending between said side elements to present a window opening and a lower opening.

11. The modular sidewall of claim 6, wherein a portion of said bottom element of said main frame section is removed to present a wheel well.

12. The modular sidewall of claim 1, wherein said outer frame comprises a generally horizontal top element and a pair of side elements extending vertically from ends of said top element, wherein the plurality of individual frame sections are positioned between the pair of side elements.

13. A modular sidewall for a passenger vehicle, said modular sidewall comprising:
an outer frame; and
a plurality of individual frame sections configured to be secured together at least partially within said outer frame, wherein said plurality of individual frame sections includes
a main frame section presenting at least one window opening configured to receive a window,
a standard frame section presenting at least one window opening configured to receive a window,
a contracted frame section presenting at least one window opening configured to receive a window, wherein said standard frame section has a width that is smaller than a width of said main frame section, and wherein said contracted frame section has a width that is smaller than the width of said standard frame section.

14. The modular sidewall of claim 13, wherein said plurality of individual frame sections further comprises a support frame section, wherein said support frame section is not configured to receive a window, wherein said support frame section has a width that is smaller than the width of said contracted frame section.

15. The modular sidewall of claim 13, wherein said plurality of individual frame sections are secured to said outer frame via one or more connection components, wherein said connection components are selected from rivets, fillet welds, and spot welds, and wherein said plurality of individual frame sections are secured to each other via one or more connection components.

16. The modular sidewall of claim 13, wherein each of said plurality of individual frame sections comprises a top element, a bottom element, and a pair of side elements extending between said top element and said bottom element.

17. The modular sidewall of claim 16, wherein said top element and said side elements are formed from metal c-channel, and wherein said bottom elements are formed from metal z-channel.

18. A method of manufacturing a modular sidewall for a passenger vehicle, said method comprising the steps of:

(a) providing an outer frame;
(b) securing a plurality of individual frame sections together within the outer frame to form the modular sidewall, wherein plurality of individual sections includes
a main frame section presenting at least one window opening configured to receive a window, and
a standard frame section presenting at least one window opening configured to receive a window,
wherein the standard frame section has a width that is smaller than a width of the main frame section; and
(c) securing the frame of the modular sidewall to a side of the passenger vehicle.

19. The method of claim 18, wherein the plurality of individual frame sections are secured to the outer frame via one or more connection components, wherein said connection components are selected from rivets, fillet welds, and spot welds, and wherein the plurality of individual frame sections are secured to each other via one or more connection components.

20. The method of claim 18, wherein each of the plurality of individual frame sections comprises a top element, a bottom element, and a pair of side elements extending between the top element and the bottom element, wherein the top element and the side elements are formed from metal c-channel, and wherein the bottom element is formed from metal z-channel.

* * * * *